United States Patent
Kwon

(10) Patent No.: US 11,345,203 B2
(45) Date of Patent: May 31, 2022

(54) BALL JOINT AND HYBRID SUSPENSION ARM INCLUDING SAME

(71) Applicant: ILJIN CO., LTD., Gyeongju-si (KR)

(72) Inventor: Tae Sung Kwon, Gyeongju-si (KR)

(73) Assignee: ILJIN CO., LTD., Gyeongju-si (KR)

( * ) Notice: Subject to any disclaimer, the term of this patent is extended or adjusted under 35 U.S.C. 154(b) by 0 days.

(21) Appl. No.: 16/793,325

(22) Filed: Feb. 18, 2020

(65) Prior Publication Data

US 2020/0180377 A1    Jun. 11, 2020

Related U.S. Application Data

(63) Continuation of application No. PCT/KR2018/009460, filed on Aug. 17, 2018.

(30) Foreign Application Priority Data

Aug. 18, 2017  (KR) .......................... 10-2017-0104840

(51) Int. Cl.
*B60G 7/00* (2006.01)
*F16C 11/06* (2006.01)

(52) U.S. Cl.
CPC ............. *B60G 7/005* (2013.01); *B60G 7/001* (2013.01); *F16C 11/0633* (2013.01); *F16C 11/0685* (2013.01); *F16C 11/0695* (2013.01); *B60G 2204/416* (2013.01); *B60G 2206/122* (2013.01); *F16C 2326/05* (2013.01)

(58) Field of Classification Search
CPC .. B60G 7/005; B60G 7/001; B60G 2204/416; B60G 2206/122; B60G 2204/418; F16C 11/0633; F16C 11/0685; F16C 11/0695; F16C 2326/05; F16C 11/0623
See application file for complete search history.

(56) References Cited

U.S. PATENT DOCUMENTS

| | | | | |
|---|---|---|---|---|
| 3,909,084 A | * | 9/1975 | Snidar ................. | F16C 11/0619 384/203 |
| 4,577,989 A | * | 3/1986 | Ito ....................... | F16C 11/0638 403/140 |
| 6,019,541 A | * | 2/2000 | Maughan ............ | F16C 11/0638 403/140 |

(Continued)

FOREIGN PATENT DOCUMENTS

| | | | |
|---|---|---|---|
| JP | 2008511798 A | | 4/2008 |
| KR | 1020130019742 A | | 2/2013 |

(Continued)

OTHER PUBLICATIONS

International Search Report for PCT/KR2018/009460 dated Nov. 21, 2018.

*Primary Examiner* — Darlene P Condra
(74) *Attorney, Agent, or Firm* — Dinsmore & Shohl LLP; Yongsok Choi, Esq.

(57) ABSTRACT

A ball joint according to one embodiment of the present invention comprises: a ball stud comprising a spherical ball and a rod extending upwardly from the ball; a bearing comprising an upper outer peripheral surface and a lower outer peripheral surface and configured to accommodate the ball; and a case comprising an upper inner peripheral surface which entirely comes into contact with the upper outer peripheral surface of the bearing and a stopper to which an upper end of the bearing is caught.

18 Claims, 11 Drawing Sheets

(56) References Cited

U.S. PATENT DOCUMENTS

| | | | | |
|---|---|---|---|---|
| 6,109,816 | A * | 8/2000 | Iwasaki | B60G 7/005 |
| | | | | 403/122 |
| 6,821,047 | B2 * | 11/2004 | Broker | F16C 11/0638 |
| | | | | 403/132 |
| 10,001,163 | B1 * | 6/2018 | Elterman | F16C 11/0685 |
| 10,711,830 | B2 * | 7/2020 | Englebright | F16C 11/08 |
| 2004/0165940 | A1 | 8/2004 | Fotino et al. | |
| 2012/0301214 | A1 | 11/2012 | Forthaus et al. | |
| 2013/0075994 | A1 * | 3/2013 | Lee | F16C 11/083 |
| | | | | 280/124.11 |
| 2015/0063899 | A1 | 3/2015 | Sato et al. | |
| 2017/0350441 | A1 * | 12/2017 | Parker, Jr. | F16C 11/0623 |
| 2019/0217679 | A1 * | 7/2019 | Kuroda | F16C 11/06 |

FOREIGN PATENT DOCUMENTS

| | | |
|---|---|---|
| KR | 1020130097193 A | 9/2013 |
| KR | 1020170080448 A | 7/2017 |

* cited by examiner

BALL JOINT AND HYBRID SUSPENSION ARM INCLUDING SAME

CROSS REFERENCE TO RELATED APPLICATIONS

This application is a continuation of International Application No. PCT/KR2018/009460 filed on Aug. 17, 2018 claiming priority to Korean Patent Application No. 10-2017-0104840 filed on Aug. 18, 2017, the entire contents of which are herein incorporated by reference.

TECHNICAL FIELD

The present disclosure relates to a ball joint and a hybrid suspension arm including the same.

BACKGROUND ART

A suspension of a vehicle is a device for connecting a wheel to a vehicle body. The suspension comprises a spring for absorbing a vibration or an impact transferred from a road surface to the vehicle body, a shock absorber for adjusting an operation of the spring, and a suspension arm or a suspension link for controlling an operation of the wheel.

The suspension may be classified into a s arm type, a wishbone type, and a MacPherson strut type according to a method for controlling an operation of the wheel. The wishbone type suspension comprises a suspension arm (a lower control arm) for connecting a knuckle engaged with the Wheel to the vehicle body. That is, one end of the suspension arm is connected to a cross member or a subframe constituting the vehicle body, and the other end of the suspension arm is connected to the knuckle through a ball joint. The suspension arm supports the wheel on the vehicle body and appropriately controls a toe-in of the wheel according to a driving condition of the vehicle, thereby improving straight drivability and steering stability of the vehicle.

The ball joint comprises a ball stud having a ball and a rod, a bearing for accommodating the ball and a case for accommodating the ball and the bearing, and an insert molding part is formed between an upper outer circumferential surface of the bearing and an upper inner circumferential surface of the case.

SUMMARY

Technical Problem

Since the ball joint is conventionally configured such that the insert molding part, which has an elastic coefficient that is smaller than that of the case, is interposed between the upper outer circumferential surface of the bearing and the upper inner circumferential surface of the case, when a force acts in a direction of separating the ball stud from the bearing, the insert molding part interposed between the upper outer circumferential surface of the bearing and the upper inner circumferential surface of the case is likely to be damaged or deformed. Accordingly, the ball stud can be relatively easily separated from the bearing.

The present disclosure is to solve the above-described problems of the prior art. The present disclosure is directed to providing a ball joint including a bearing and a case, which is capable of firmly holding a ball stud, and a hybrid suspension arm including the same.

Technical Solution

Embodiments according to one aspect of the present disclosure relate to a ball joint. The ball joint according to exemplary embodiments comprises a ball stud comprising a spherical ball and a rod extending upwardly from the ball; a bearing comprising an upper outer circumferential surface and a lower outer circumferential surface and configured to accommodate the ball; and a case comprising an upper inner circumferential surface which entirely comes into contact with the upper outer circumferential surface of the bearing and a stopper to which an upper end of the bearing is caught.

In one embodiment, the stopper may have a ring shape extending inwardly from an upper end portion of the case.

In one embodiment, an inner diameter of the stopper may be smaller than a maximum outer diameter of the ball.

In one embodiment, an inner diameter of the upper end of the bearing may be smaller than a maximum outer diameter of the ball.

In one embodiment, the case may be formed of a metal material including carbon steel or chromium-molybdenum steel.

In one embodiment, the upper outer circumferential surface of the bearing and the upper inner circumferential surface of the case may be curved surfaces having a same curvature.

In one embodiment, the case may further comprise a lower inner circumferential surface which partially comes into contact with the lower outer circumferential surface of the bearing.

In one embodiment, the bearing may further comprise a plurality of slots formed over an entirety of the upper outer circumferential surface and a portion of the lower outer circumferential surface and arranged to be spaced apart from each other at regular intervals in a circumferential direction.

In one embodiment, the plurality of slots may be provided as two slots and a width of the plurality of slots may be 0.5 mm.

In one embodiment, the bearing may further comprise a plurality of recesses formed on the lower outer circumferential surface and arranged to be spaced apart from each other in the circumferential direction.

In one embodiment, the bearing may further comprise a plurality of protrusions formed on the lower outer circumferential surface and arranged to be spaced apart from each other in the circumferential direction.

Embodiments according to another aspect of the present disclosure relate to a hybrid suspension arm. The hybrid suspension arm according to exemplary embodiments may comprise the above-described ball joint; an arm body to which the case of the ball joint is coupled; and an insert molding part formed to surround a portion of the lower outer circumferential surface of the bearing, a portion of the case, and a portion of the arm body so as to couple the bearing, the case, and the arm body.

In one embodiment, the case may further comprise a lower inner circumferential surface which partially comes into contact with the lower outer circumferential surface of the bearing.

In one embodiment, the insert molding part may be formed to surround a lower end portion of the bearing, a portion of the lower outer circumferential surface of the bearing, a lower end portion of the case, a portion of the lower inner circumferential surface of the case, a portion of an outer circumferential surface of the case, and a portion of the arm body.

In one embodiment, the bearing may comprise a plurality of recesses formed on the lower outer circumferential surface and arranged to be spaced apart from each other in the circumferential direction, and a portion of the insert molding part may be filled in a space formed by the plurality of recesses and the lower inner circumferential surface of the case.

In one embodiment, the bearing may comprise a plurality of protrusions formed on the lower outer circumferential surface and arranged to be spaced apart from each other in the circumferential direction, and a portion of the insert molding part may be filled in a space formed by two adjacent protrusions among the plurality of protrusions, the lower outer circumferential surface of the bearing, and the lower inner circumferential surface of the case.

In one embodiment, the case may be coupled to the arm body by press-fit.

In one embodiment, the case may be coupled to the arm body by welding.

Advantageous Effects

In accordance with the ball joint and the hybrid suspension arm according to one embodiment, the upper outer circumferential surface of the bearing may entirely come into contact with the upper inner circumferential surface of the case, and the upper end of the bearing is directly caught to the stopper of the case. Therefore, even when a force acts in a direction in which the ball stud is separated from the bearing, the ball stud can be firmly held and supported in the bearing and the case without being easily separated from the bearing and the case. Consequently, durability of the ball joint and the hybrid suspension arm can be improved.

DETAILED DESCRIPTION

Figure 1:
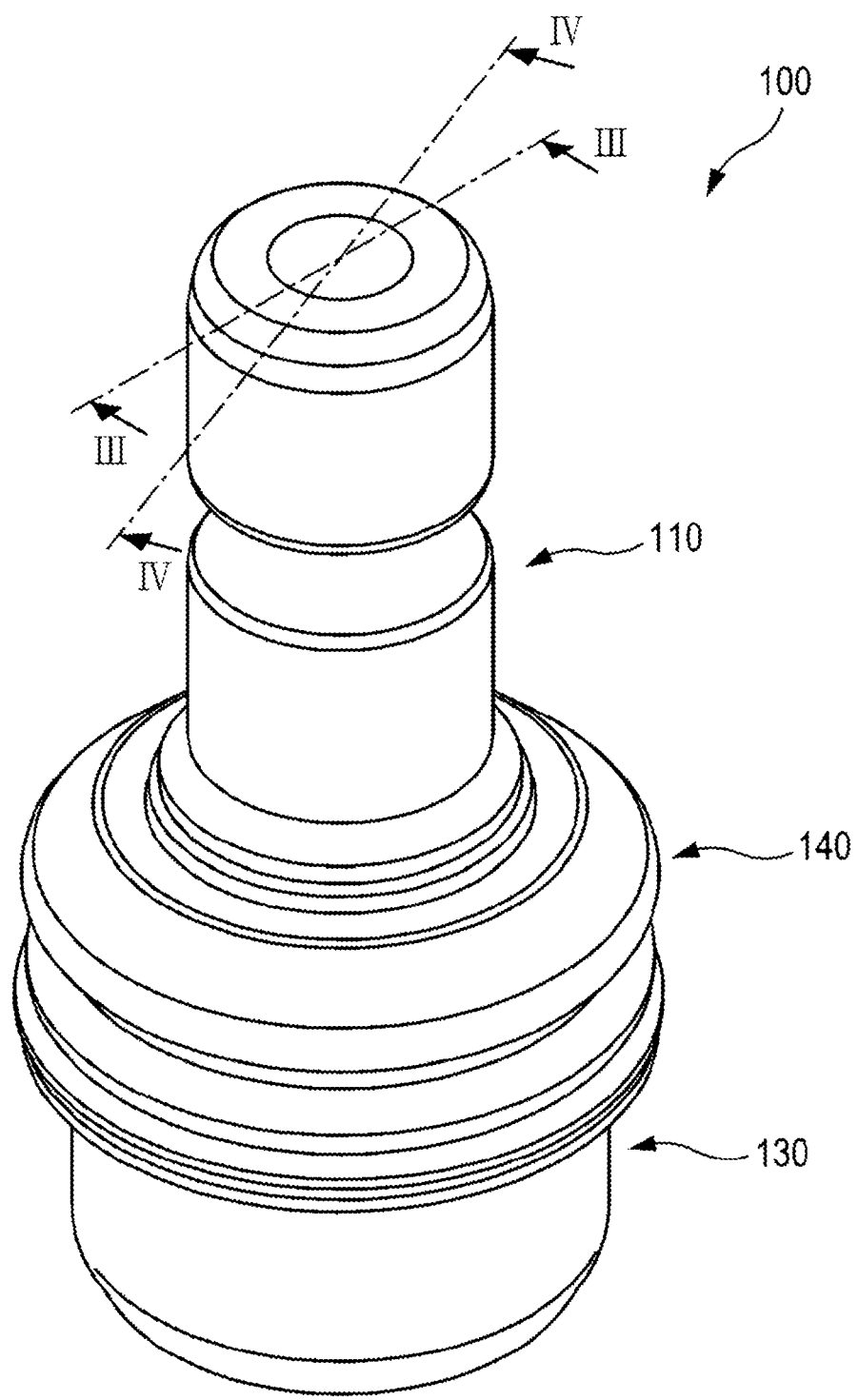
FIG. 1 is a perspective view illustrating a ball joint according to one embodiment of the present disclosure.

Embodiments of the present disclosure are exemplified for the purpose of describing the technical spirit of the present disclosure. The scope of the claims according to the present disclosure is not limited to the embodiments described below or to the detailed descriptions of these embodiments.

Unless otherwise defined, all technical and scientific terms used herein have the same meaning commonly understood by those skilled in the art to which the present disclosure pertains. All terms used herein are selected for the purpose of more clearly describing the present disclosure and not limiting the scope of the present disclosure defined by appended claims.

Unless the phrase or sentence clearly indicates otherwise, terms "comprising," "including," "having," "taking," and the like used herein should be construed as open-ended terms encompassing the possibility of including other embodiments.

The singular form described herein may include the plural form unless the context clearly dictates otherwise, and this is equally applied to the singular form set forth in the claims.

Throughout this disclosure, when a component is referred to as being "connected" or "coupled" to another component, the component can be directly connected or coupled to another component or can be connected or coupled to another component by intervening yet another component therebetween.

Dimensions and numerical values described in the present disclosure are not limited only to the dimensions and numerical values described herein. Unless otherwise specified, these dimensions and numerical values will be understood to mean the values described herein and the equivalent ranges including the described values. For example, a dimension of "0.5 mm" described herein can be understood to include "about 0.5 mm."

Direction indicating terms such as "upward," "on," and the like used herein are based on a direction in which a rod of a ball stud is located with respect to a ball in the accompanying drawings, and direction indicating terms "downward," "below," and the like mean a direction opposite a direction of the direction indicating terms such as "upward," "on," and the like. The rod and the ball shown in the accompanying drawings may be oriented differently, and these direction indicating terms may be construed accordingly.

Hereinafter, embodiments of the present disclosure will be described with reference to the accompanying drawings. In the accompanying drawings, the same reference numerals are assigned to the same or corresponding components. Further, in the following description of the embodiments, duplicate descriptions of the same or corresponding components may be omitted. However, even though the description of a component is omitted, such a component intended to be excluded in any embodiment.

Figure 2:
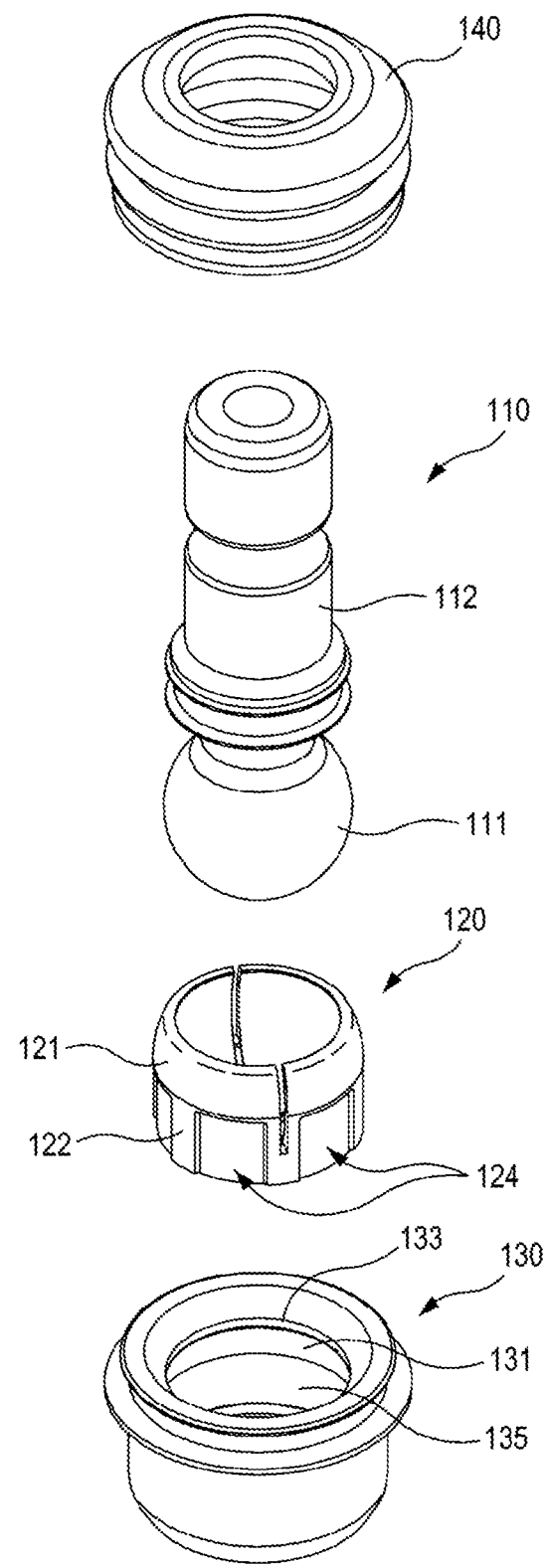
FIG. 2 is an exploded perspective view illustrating the ball joint shown in FIG. 1.

FIG. 1 is a perspective view illustrating a ball joint according to one embodiment of the present disclosure. FIG. 2 is an exploded perspective view illustrating the ball joint shown in FIG. 1.

With reference to FIGS. 1 and 2, a ball joint 100 according to one embodiment of the present disclosure may comprise a ball stud 110, a bearing 120 and a case 130.

As shown in FIG. 2, the ball stud 110 comprises a spherical ball 111 and a rod 112. The rod 112 may extend from an upper end of the ball 111 and may be integrally formed with the ball 111. That is, one end of the rod 112 is connected to the upper end of the ball 111 and the other end thereof is coupled to a knuckle of a vehicle.

The bearing 120 at least partially accommodates the ball 111 of the ball stud 110. The bearing 120 comprises a partially spherical upper outer circumferential surface 121 and a cylindrical lower outer circumferential surface 122. In one embodiment, an inner diameter ID1 of an upper end 123 of the bearing 120 may be set to be smaller than a maximum outer diameter OD of the ball 111. Therefore, it is possible to effectively prevent the ball 111 from being separated from the bearing 120.

The case 130 comprises an upper inner circumferential surface 131 and a stopper 133. The upper inner circumferential surface 131 of the case 130 entirely comes into contact with the upper outer circumferential surface 121 of the bearing 120. The upper inner circumferential surface 131 of the case 130 is in direct contact with the upper outer circumferential surface 121 of the bearing 120 without interposing any additional member or material, such as an insert molding, therebetween. Since the upper inner circumferential surface 131 of the case 130 is in direct contact with the upper outer circumferential surface 121 of the bearing 120, it may be suppressed that the bearing 120 moves upwardly with respect to the case 130. Further, the upper end 123 of the bearing 120 is caught to the stopper 133. Accordingly, the stopper 133 may prevent the bearing 120 from moving upwardly with respect to the case 130.

In one embodiment, the stopper 133 may have a ring shape extending inwardly from an upper end portion of the case 130. An inner diameter ID2 of the stopper 133 may be set to be smaller than the maximum outer diameter OD of the ball 111. Therefore, even when a strong force acts in a direction in which the ball stud 110 is separated from the bearing 120, the ball 111 may be constrained by the ring-shaped stopper 133. That is, since the case 130 comprises the ring-shaped stopper 133 having the inner diameter ID2 that is smaller than the maximum outer diameter OD of the ball 111, maximum strength for constraining the ball 111 through the case 130 may be improved. Consequently, durability of the ball joint 100 may be enhanced.

In one embodiment, the case 130 may be made of a metal material including carbon steel or chromium-molybdenum steel. In this case, the case 130 may be manufactured through a forging process. In another embodiment, the case 130 may be manufactured by press molding a pipe material. In this case, a manufacturing process may be relatively simple and a manufacturing cost of the case 130 may be reduced.

Figure 3:
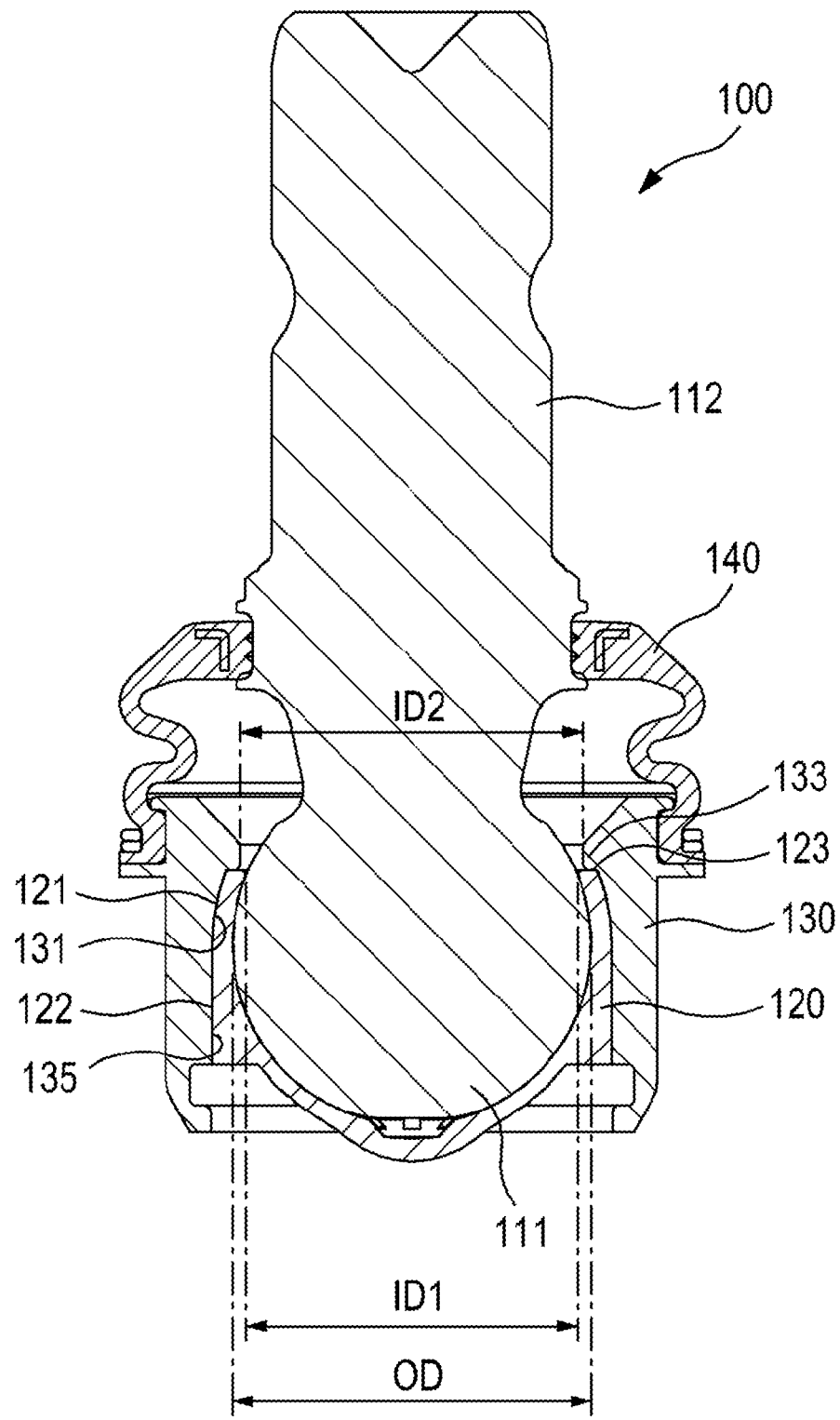
FIG. 3 is a cross-sectional view taken along line shown in FIG. 1.

FIG. 3 is a cross-sectional view taken along line III-III shown in FIG. 1.

As shown in FIG. 3, in the ball join according to one embodiment, the upper outer circumferential surface 121 of the bearing 120 and the upper inner circumferential surface 131 of the case 130 may be formed of curved surfaces having a same curvature. Since the upper outer circumferential surface 121 of the bearing 120 is matched to the upper inner circumferential surface 131 of the case 130, the bearing 120 may be prevented from moving with respect to the case 130. Further, the upper inner circumferential surface 131 of the case 130 uniformly holds and supports the upper outer circumferential surface 121 of the bearing 120 along the curved surface, a force acting on the stopper 133 of the case 130 or the upper end 123 of the bearing 120 may be distributed to an entirety of the upper inner circumferential surface 131 of the case 130 and the upper outer circumferential surface 121 of the bearing 120. Consequently, durability of the bearing 120 and the case 130 may be enhanced.

As shown in FIGS. 1 to 3, the ball joint 100 according to one embodiment may further comprise a dust cover 140. An upper end of the dust cover 140 may be coupled to the rod 112 of the ball stud 110 and a lower end thereof may be coupled to an outer circumferential surface of the case 130. The dust cover 140 prevents foreign materials, such as water and dust, from infiltrating into the case 130 or the bearing 120.

Figure 4:
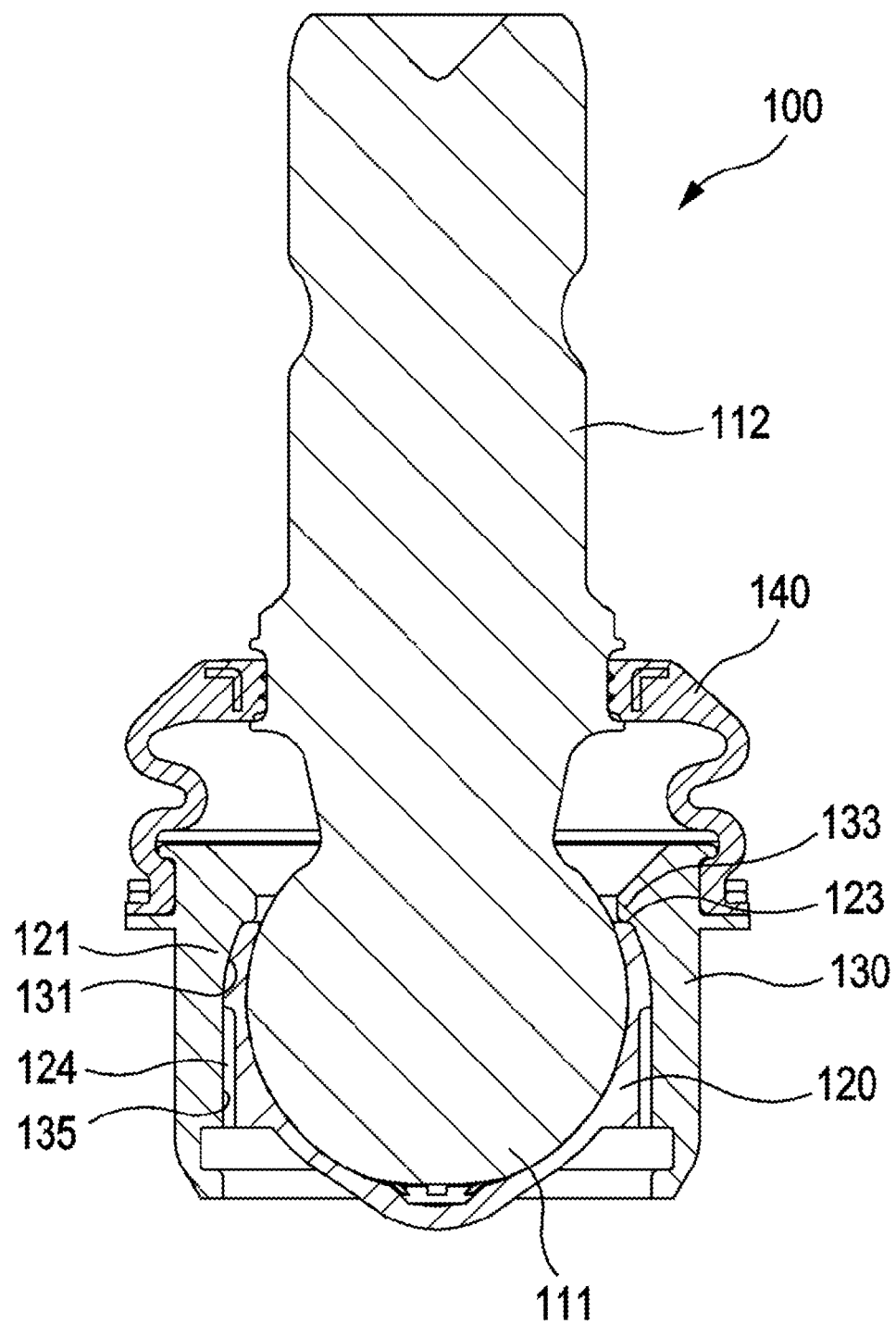
FIG. 4 is a cross-sectional view taken along line IV-IV shown in FIG. 1.

FIG. 4 is a cross-sectional view taken along line IV-IV shown in FIG. 1.

As shown in FIGS. 2 to 4, the case 130 according to one embodiment may further comprise a lower inner circumferential surface 135 which partially comes into contact with the lower outer circumferential surface 122 of the bearing 120. That is, the lower inner circumferential surface 135 of the case 130 and the lower outer circumferential surface 122 of the bearing 120 may comprise portions which are in direct contact with each other without interposing any additional member or material, such as an insert molding, therebetween and portions that any additional member or material, such as an insert molding, is interposed therebetween.

Figure 5:
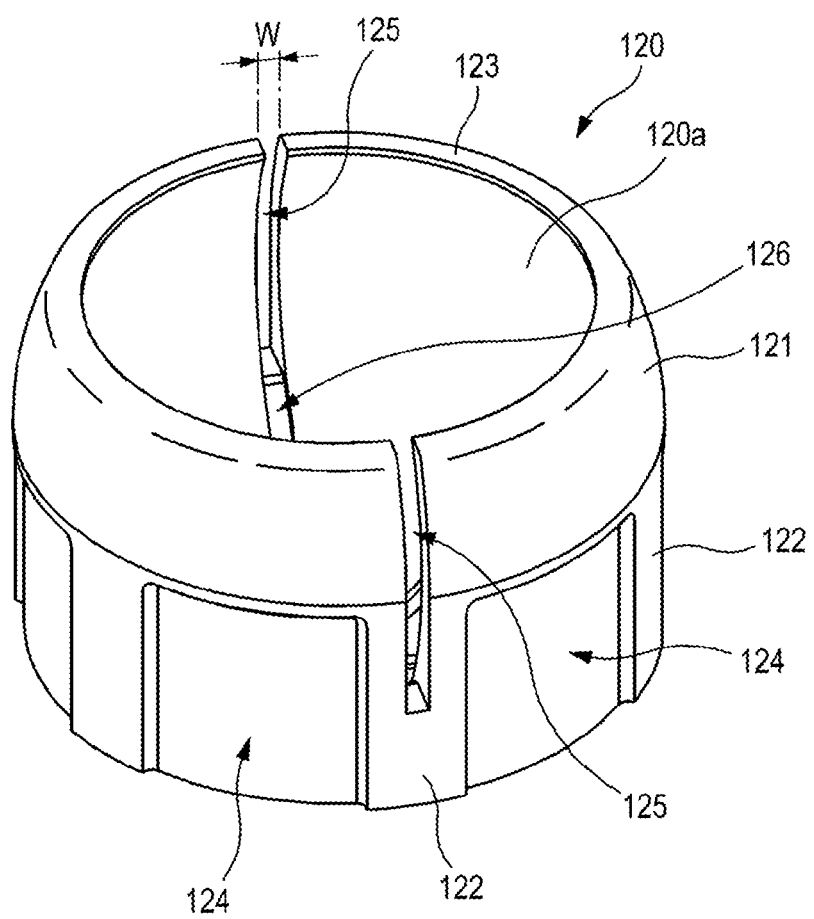
FIG. 5 is a perspective view illustrating a bearing shown in FIG. 2.

FIG. 5 is a perspective view illustrating the bearing shown in FIG. 2.

As shown in FIG. 5, the bearing 120 according to one embodiment may comprise a plurality of recesses 124 formed on the lower outer circumferential surface 122 and arranged to be spaced apart from each other in a circumferential direction. In one embodiment, the recess 124 may have a predetermined depth from the lower outer circumferential surface 122. An insert molding part 320 of a plastic material, which will be described below, may be formed in the recess 124 to prevent the bearing 120 from being relatively rotated relative to the case 130 in the circumferential direction.

As shown in FIG. 5, the bearing 120 according to one embodiment may further comprise a plurality of slots 125. The plurality of slots 125 may be formed over an entirety of the upper outer circumferential surface 121 and a portion of the lower outer circumferential surface 122. The plurality of slots 125 provide minimum flexibility to the bearing 120 so as to prevent deformation or damage of the bearing 120 (particularly, the upper outer circumferential surface 121 of the bearing 120) when the ball 111 is inserted into the bearing 120. The plurality of slots 125 may be arranged to be spaced apart from each other at regular intervals in the circumferential direction. Therefore, uniform flexibility may be provided to the upper outer circumferential surface 121 of the bearing 120, which is partitioned by the slots 125.

In one embodiment, the plurality of slots 125 may be provided as two slots 125. Further, a width W of the slot 125 in the circumferential direction may be 0.5 mm. As compared with a case in which a bearing is provided with a number of slots and a width of the slots is relatively large, the bearing 120 may be in contact with the ball 111 as wide as possible. Thus, the bearing 120 can firmly hold and support the ball 111. Further, when a plastic molten resin is injected into the ball joint 100 as the insert molding part, it is possible to prevent widths between the slots 125 of the bearing 120 from be unevenly deformed due to a strong injection pressure as much as possible.

Figure 6:
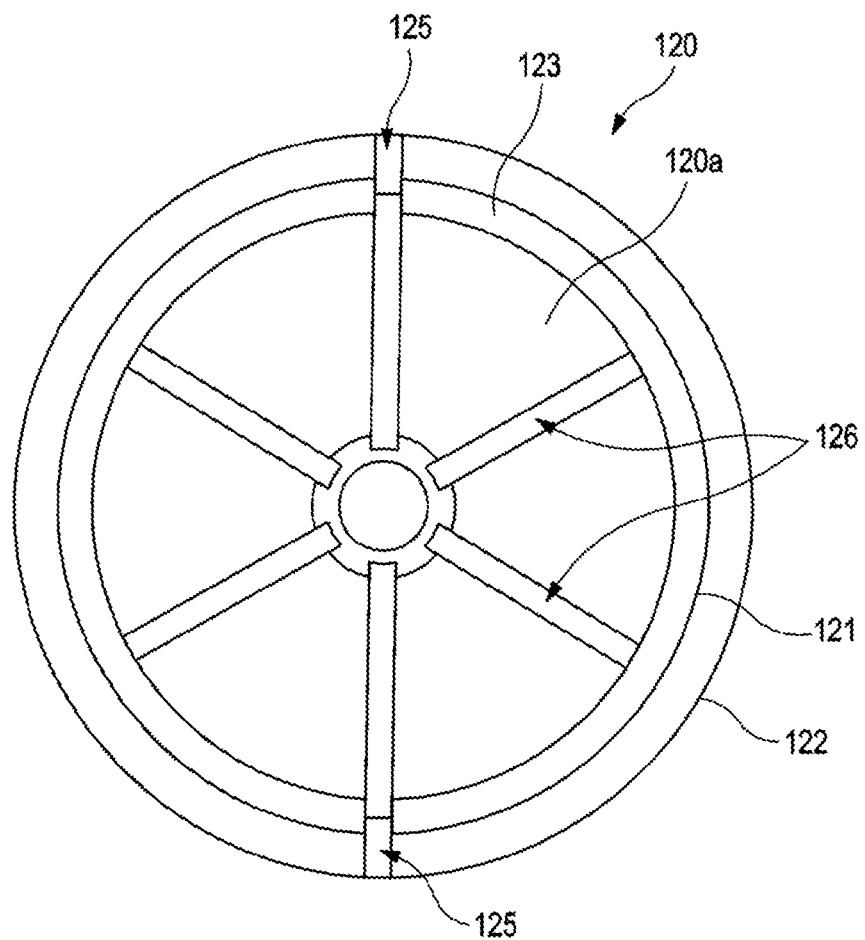
FIG. 6 is a plan view illustrating the bearing shown in FIG. 5.

FIG. 6 is a plan view illustrating the bearing shown in FIG. 5.

As shown in FIG. 6, the bearing 120 according to one embodiment may further comprise a plurality of grooves 126 formed on an inner circumferential surface 120a. The plurality of grooves 126 may be formed to extend in a direction perpendicular to the upper end 123 of the bearing 120. Alternatively, the plurality of grooves 126 may be formed to extend in a direction parallel to the upper end 123 of the bearing 120. A lubricant (for example, grease) may be injected into the plurality of grooves 126 to assist the ball 111 to be smoothly rotated in the bearing 120. The plurality of grooves 126 may be arranged to be spaced apart from each other at regular intervals in the circumferential direction. Thus, the bearing 120 may hold and support the ball 111 with a uniform force.

Figure 7:
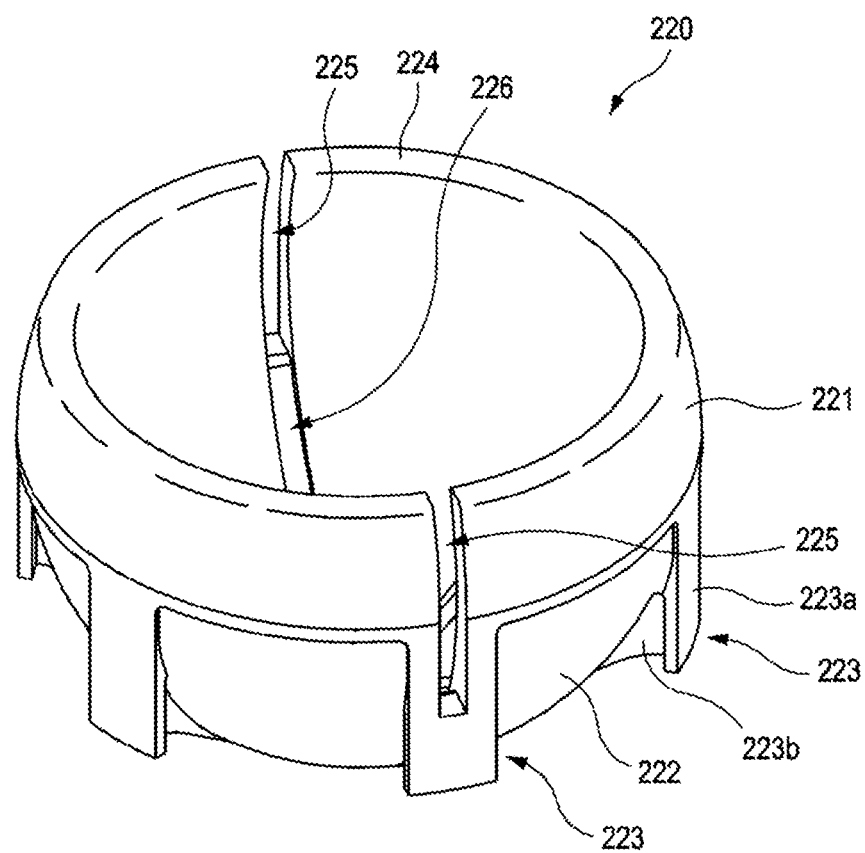
FIG. 7 is a perspective view illustrating a bearing according to another embodiment of the present disclosure.

FIG. 7 is a perspective view illustrating a bearing according to another embodiment of the present disclosure.

With reference to FIG. 7, a bearing 220 may comprise a partially spherical upper outer circumferential surface 221, a partially spherical lower outer circumferential surface 222, and protrusions 223 formed on the lower outer circumferential surface 222 and arranged to be spaced apart from each other in a circumferential direction. The protrusion 223 may comprise a cylindrical portion 223a extending in a cylindrical shape from the lower end of the upper outer circumferential surface 221, and a rib 223b for connecting the cylindrical portion 223a to the lower outer circumferential surface 222. Since the protrusion 223 comprising the cylindrical portion 223a and the rib 223b is surrounded by an insert molding part 320, which will be described below, the bearing 220 may be prevented from being relatively rotated relative to the case 130. Further, since the bearing 220 has the partially spherical lower outer circumferential surface 222, thickness of the lower outer circumferential surface 222 of the bearing 220 may be thinner. Consequently, weight reduction of the bearing 220 may be achieved. The plurality of protrusions 223 may be arranged at regular intervals in the circumferential direction. Accordingly, since a relative rotating force of the bearing 220 with respect to the case 130 acts uniformly on the plurality of protrusions 223, the bearing 220 may be more effectively prevented from being relatively rotated relative to the case 130. Similar to the bearing 120 according to the embodiment shown in FIGS. 5 and 6, the bearing 220 according to the embodiment shown in FIG. 7 may further comprise an upper end 224 which is caught by the stopper 133, a plurality of slots 225 and a plurality of grooves 226.

Figure 8:
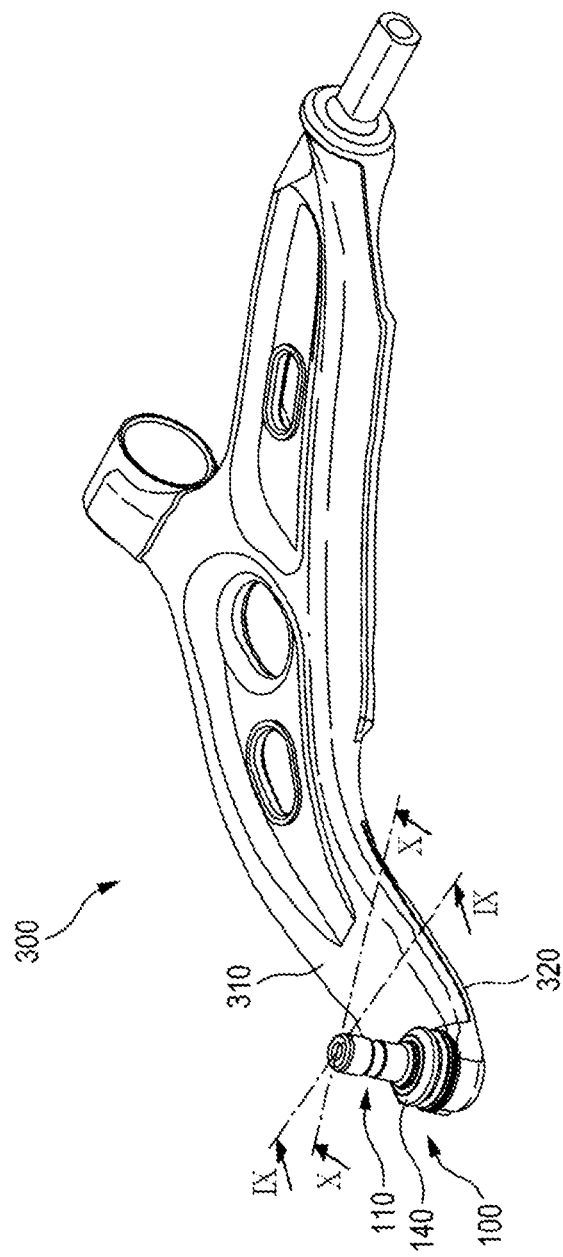
FIG. 8 is a perspective view illustrating a hybrid suspension arm according to one embodiment of the present disclosure.
Figure 9:
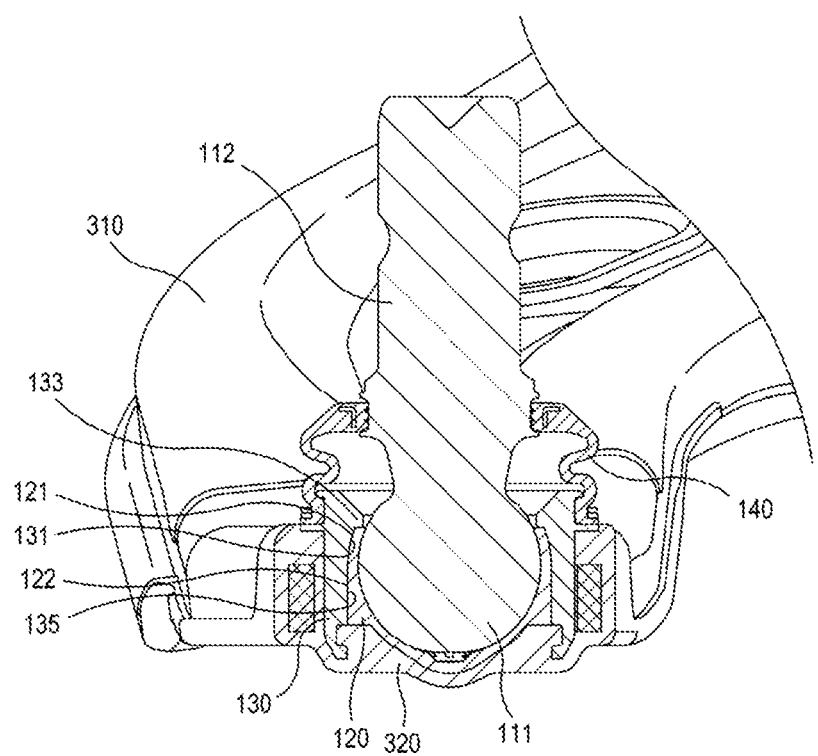
FIG. 9 is a cross-sectional view taken along line IX-IX shown in FIG. 8.

FIG. 8 is a perspective view illustrating a hybrid suspension arm according to one embodiment of the present disclosure. FIG. 9 is a cross-sectional view taken along line IX-IX shown in FIG. 8.

With reference to FIGS. 8 and 9, a hybrid suspension arm 300 according to one embodiment of the present disclosure may comprise a ball joint 100, an arm body 310, and an insert molding part 320. One end of the hybrid suspension arm 300 is connected to a portion of a vehicle body, and the other end thereof is connected to a knuckle through the ball joint 100. Since the ball joint 100 according to the embodiment shown in FIGS. 8 and 9 may have the same configuration as the ball joint 100 according to the embodiment shown in FIGS. 1 to 4, detailed descriptions thereof will be omitted herein. FIGS. 8 and 9 exemplarily illustrate a case in which the hybrid suspension arm 300 is applied to a lower control arm, but the hybrid suspension arm 300 according to the present disclosure is not limited thereto and may be also applied to an upper control arm in the same manner shown in FIGS. 8 and 9.

The case 130 of the ball joint 100 is coupled to the arm body 310. In one embodiment, the case 130 may be coupled to the arm body 310 by press-fit. Alternatively, the case 130 may be coupled to the arm body 310 by welding along the outer circumferential surface of the case 130 in a state of being temporarily fixed to the arm body 310. Also alternatively, the case 130 may be coupled to the arm body 310 by a combination of press-fit and welding. For example, the case 130 may be coupled to the arm body 310 by welding along the outer circumferential surface of the case 130 in a state of being press-fitted to the arm body 310. When the hybrid suspension arm 300 is applied to a lower control arm, the arm body 310 may have generally L-shape. When the hybrid suspension arm 300 is applied to an upper control arm, the arm body 310 may have generally U-shape.

The insert molding part 320 is formed to surround a portion of the lower outer circumferential surface 122 of the bearing 120, a portion of the case 130 and a portion of the arm body 310 to couple the bearing 120, the case 130 and the arm body 310 to each other. For example, the insert molding part 320 may be formed to surround a lower end portion of bearing 120, a portion of the lower outer circumferential surface 122 of the bearing 120, a lower end portion of the case 130, a portion of the lower inner circumferential surface 135 of the case 130, a portion of the outer circumferential surface of the case 130, and the arm body 310. That is, the insert molding part 320 is not formed between the upper outer circumferential surface 121 of the bearing 120 and the upper inner circumferential surface 131 of the case 130. When the bearing 120 in which the ball stud 110 is accommodated is inserted into the case 130 coupled to the arm body 310, the upper outer circumferential surface 121 of the bearing 120 is in direct contact with the upper inner circumferential surface 131 of the case 130 so that the bearing 120 and the ball stud 110 may be accurately located with respect to the case 130. Further, even when a plastic molten resin is injected from below the ball joint 100 as the insert molding part, it is possible to effectively prevent the ball stud 110 or the bearing 120 from relatively moving relative to case 130. Consequently, a defective rate of the hybrid suspension arm 300 may be decreased, and productivity thereof may be increased.

Figure 10:
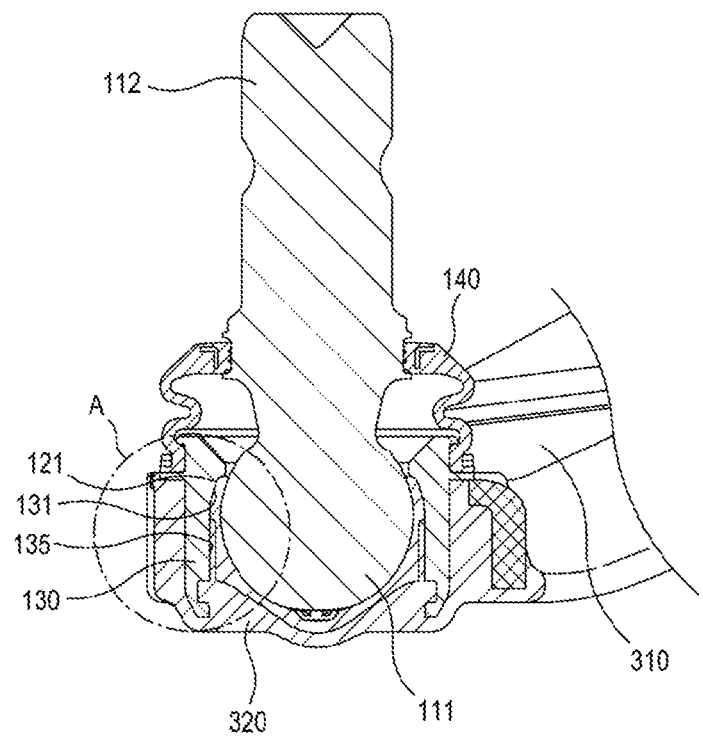
FIG. 10 is a cross-sectional view taken along line X-X shown in FIG. 8.
Figure 11:
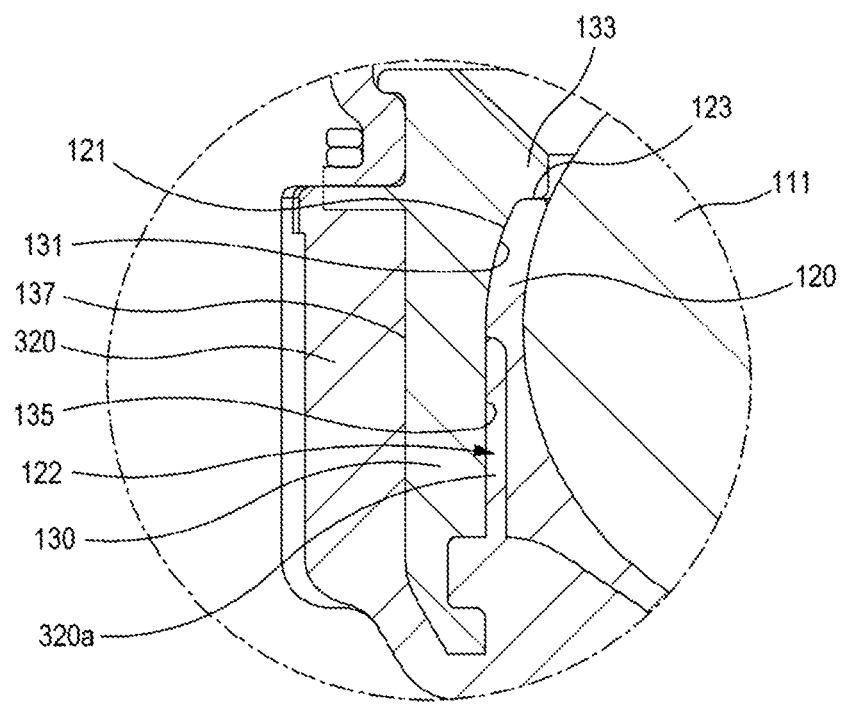
FIG. 11 is a partially enlarged view illustrating Portion A shown in FIG. 10.

FIG. 10 is a cross-sectional view taken along line X-X shown in FIG. 8. FIG. 11 is a partially enlarged view illustrating Portion A shown in FIG. 10.

As shown in FIGS. 10 and 11, when the bearing 120 comprises a plurality of recesses 124, portions 320a of the insert molding part 320 may be interposed or filled in a space formed by the recesses 124 of the bearing 120 and the lower inner circumferential surface 135 of the case 130. Accordingly, it is possible to prevent the bearing 120 from being rotated relative to the case 130 or the arm body 310.

Figure 12:
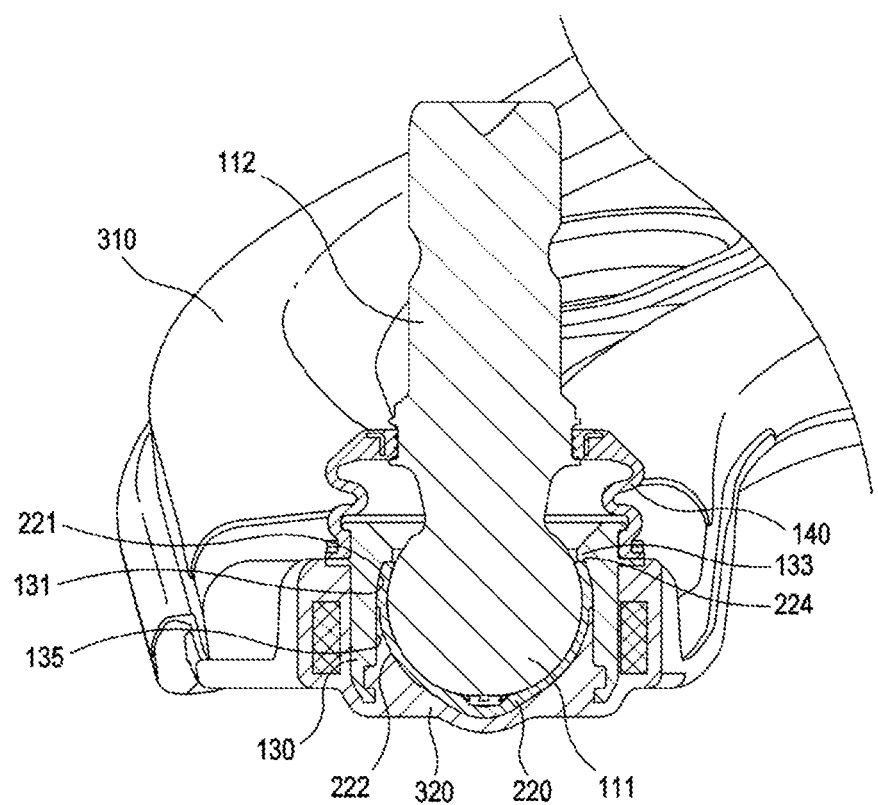
FIG. 12 is a cross-sectional view illustrating a hybrid suspension arm according to another embodiment of the present disclosure.

FIG. 12 is a cross-sectional view illustrating a hybrid suspension arm according to another embodiment of the present disclosure.

As shown in FIG. 12, when the bearing 220 comprises a plurality of protrusions 223, a portion of the insert molding part 320 may be interposed or filled in a space formed by the lower outer circumferential surface 222, two adjacent protrusions 223 of the bearing 220 and the lower inner circumferential surface 135 of the case 130. Accordingly, it is possible to prevent the bearing 220 from being rotated relative to the case 130 or the arm body 310.

Although the technical spirit of the present disclosure has been described by way of some embodiments and examples shown in the accompanying drawings, it should be noted that various substitutions, modification, and alterations can be devised by those skilled in the art to which the present disclosure pertains without departing from the technical spirit and scope of the present disclosure. Further, it should be construed that these substitutions, modifications, and variations are included within the scope of the appended claims.

What is claimed is:

1. A ball joint comprising:
   a ball stud comprising a spherical ball and a rod extending upwardly from the ball;

a bearing comprising an upper outer circumferential surface and a lower outer circumferential surface and configured to accommodate the ball; and a case comprising an upper inner circumferential surface which entirely comes into contact with the upper outer circumferential surface of the bearing and a stopper to which an upper end of the bearing is caught, wherein the bearing further comprises a plurality of recesses formed on the lower outer circumferential surface and arranged to be spaced apart from each other in a circumferential direction, and wherein an insert molding part of a plastic material is filled in the plurality of recesses.

2. The ball joint of claim 1, wherein the stopper has a ring shape extending inwardly from an upper end portion of the case.

3. The ball joint of claim 2, wherein an inner diameter of the stopper is smaller than a maximum outer diameter of the ball.

4. The ball joint of claim 1, wherein an inner diameter of the upper end of the bearing is smaller than a maximum outer diameter of the ball.

5. The ball joint of claim 1, wherein the case is formed of a metal material including carbon steel or chromium-molybdenum steel.

6. The ball joint of claim 1, wherein the upper outer circumferential surface of the bearing and the upper inner circumferential surface of the case are curved surfaces having a same curvature.

7. The ball joint of claim 1, wherein the case further comprises a lower inner circumferential surface which partially comes into contact with the lower outer circumferential surface of the bearing.

8. The ball joint of claim 7, wherein the bearing further comprises a plurality of slots formed over an entirety of the upper outer circumferential surface and a portion of the lower outer circumferential surface and arranged to be spaced apart from each other at regular intervals in a circumferential direction.

9. The ball joint of claim 8, wherein the plurality of slots are provided as two slots.

10. The ball joint of claim 8, wherein a width of the plurality of slots is 0.5 mm.

11. The ball joint of claim 7, wherein the bearing further comprises a plurality of protrusions formed on the lower outer circumferential surface and arranged to be spaced apart from each other in a circumferential direction.

12. A hybrid suspension arm comprising:

the ball joint according to claim 1; and an arm body to which the case of the ball joint is coupled, wherein the insert molding part is formed to surround a portion of the lower outer circumferential surface of the bearing, a portion of the case, and a portion of the arm body so as to couple the bearing, the case, and the arm body to each other.

13. The ball joint of claim 12, wherein the case further comprises a lower inner circumferential surface which partially comes into contact with the lower outer circumferential surface of the bearing.

14. The ball joint of claim 13, wherein the insert molding part is formed to surround a lower end portion of the bearing, a portion of the lower outer circumferential surface of the bearing, a lower end portion of the case, a portion of the lower inner circumferential surface of the case, a portion of an outer circumferential surface of the case, and the portion of the arm body.

15. The ball joint of claim 13, wherein:

a portion of the insert molding part is filled in a space formed by the plurality of recesses and the lower inner circumferential surface of the case.

16. The ball joint of claim 13, wherein:

the bearing comprises a plurality of protrusions formed on the lower outer circumferential surface and arranged to be spaced apart from each other in a circumferential direction; and a portion of the insert molding part is filled in a space formed by two adjacent protrusions among the plurality of protrusions, the lower outer circumferential surface of the bearing, and the lower inner circumferential surface of the case.

17. The ball joint of claim 12, wherein the case is coupled to the arm body by press-fit.

18. The ball joint of claim 12, wherein the case is coupled to the arm body by welding.

* * * * *